United States Patent Office 3,304,359
Patented Feb. 14, 1967

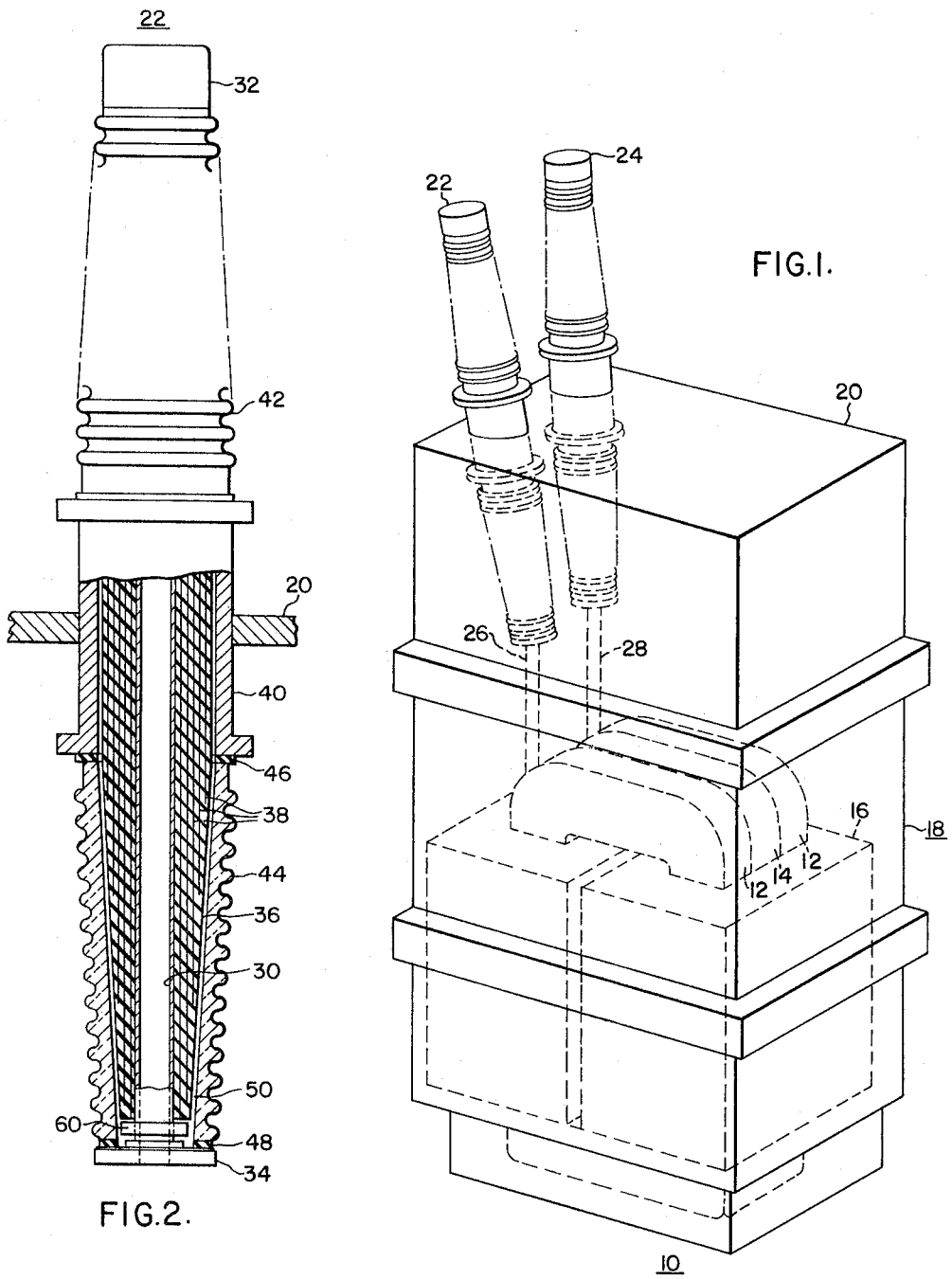

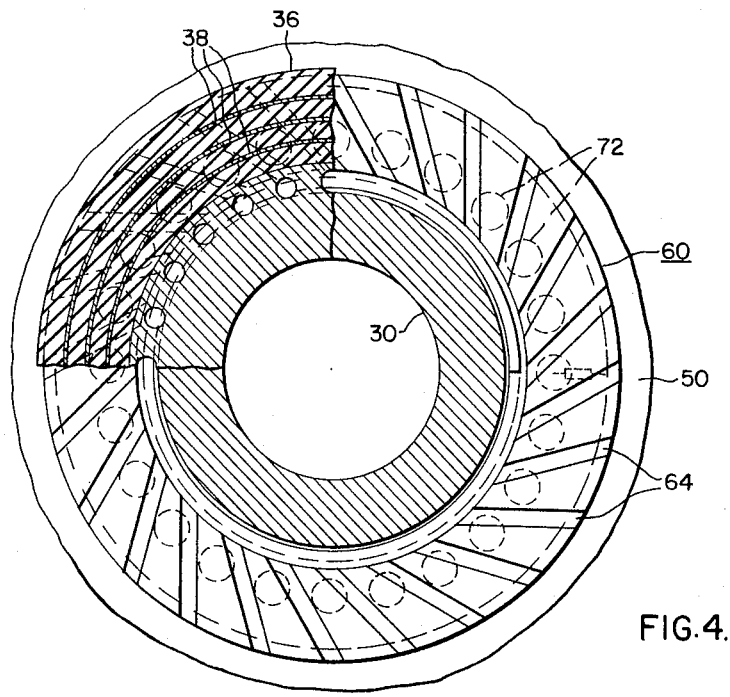
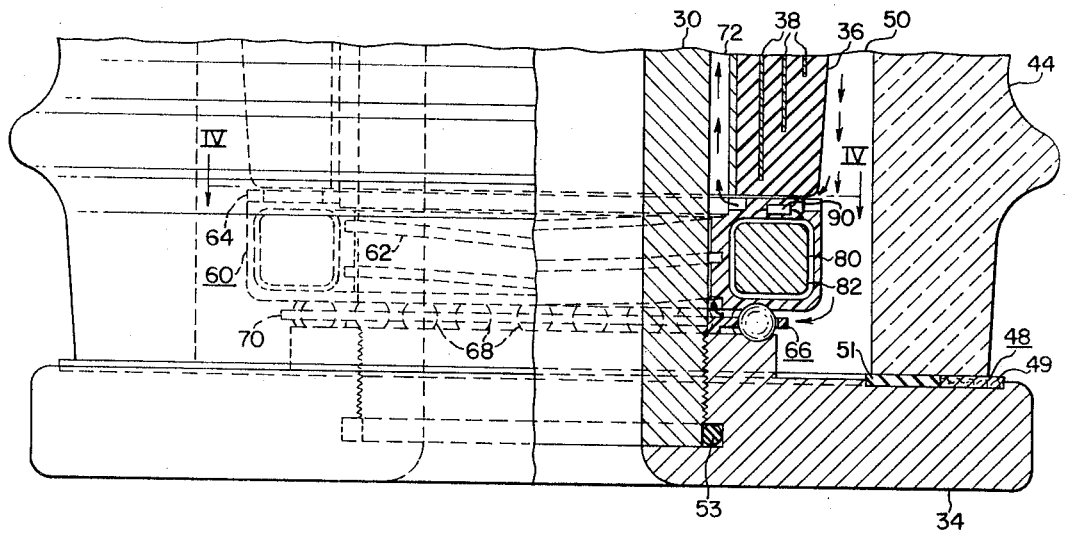

3,304,359
ELECTRICAL BUSHING WITH INDUCTOR-TYPE FLUID-CIRCULATING IMPELLER
Louis E. Sauer, Sharon, Pa., assignor to Westinghouse Electric Corporation, Pittsburgh, Pa., a corporation of Pennsylvania
Filed Oct. 14, 1965, Ser. No. 495,785
6 Claims. (Cl. 174—15)

This invention relates in general to insulating bushings for electrical apparatus, and more specifically to forced cooled insulating bushings.

Electrical insulating bushings for high voltage electrical apapratus, such as power transformers and power circuit breakers, generally are of the condenser type, having solid insulation, such as oil impregnated paper, with spaced layers of conductive foil. The solid insulation is generally disposed on the bushing electrical conductor. The solid insulation acts as an effective barrier against the conduction of heat in a radial direction, however, thus presenting a problem in dissipating the heat produced by the flow of electrical current through the electrical conductor. Thus, a large proportion of the heat that is generated in the electrical conductor must be conducted to its ends where it may be radiated either to the outside air by the bushing cap, or conducted to the cooling medium disposed within the electrical apparatus it is serving.

With the trend to extra high voltage (EHV) power transmission, the problem of cooling the electrical insulating bushings associated with the electrical apparatus utilized in the transmission system is greatly magnified, as the thickness of the solid electrical insulation is increased, and the overall length of the bushing is increased. Dielectric heating of the bushing insulation, which is negligible on lower voltage ratings because of the low power factor of oil impregnated paper insulation, adds to the heat produced by the bushings used on voltages of 500 kv. and above, as the heat produced by dielectric heating is a function of the square of the voltage gradient. It is essential that the temperature of the insulation be kept within predetermined limits, as the power factor of the insulation increases with temperature, which increases the dielectric heating rate, which again increases the power factor, with this cycle progressing until complete breakdown of the insulation occurs.

The cooling problem, while present in all high voltage condenser type bushings, is particularly acute with high voltage power transformers, as the current rating of an insulating bushing depends in part on the maximum temperature of the cooling medium which is disposed within the electrical apparatus. Since the temperature rise of the cooling medium, such as oil, in power circuit breakers and instrument transformers is substantially lower than it is in power transformers, the current ratings for similar bushings would be lower for power transformer applications than for other applications at the same voltage level.

The highest temperature of the electrical conductor, or the "hot spot" of an electrical bushing, occurs substantially at the midpoint of the bushing, and current limits are placed on bushings in order to prevent the hot spot temperature of the bushing from exceeding the operating limits of the particular insulation used.

In order to more rapidly dissipate the heat produced in the electrical conductor by resistance heating, and the heat produced in the insulation by dielectric heating, and thus increase the current rating of the bushing, forced cooling of the bushing may be utilized. For example, U.S. Patent 3,067,279, issued December 4, 1962, and assigned to the same assignee as the present application, teaches the utilization of a portion of the electrical energy passing through the electrical conductor to operate a motor and pump to circulate a cooling medium in thermal communication with the electrical conductor. This approach, while effective, has the disadvantage of requiring a transformer for obtaining electrical energy from the energy passing through the electrical conductor, a motor and a pump. These components add substantially to the initial cost of the bushing, increase the size of the bushing, and require periodic maintenance at much shorter intervals than the electrical apparatus that it is serving. It would be desirable to obtain a force flow of cooling medium through the insulating bushing without unduly complicating the bushing structure, without substantially increasing its size and cost, and without adding to the normal maintenance and inspection of the bushing.

Accordingly, it is an object of this inventoin to provide a new and improved insulating bushing for electrical apparatus.

Another object of the invention is to provide a new and improved forced cooled insulating bushing for electrical apparatus.

A further object of the invention is to provide a new and improved forced cooled insulating bushing which obtains its motive force from the electrical energy passing through the bushing.

Still another object of the invention is to provide a new and improved insulating bushing which provides forced circulation of a cooling medium to the bushing, with a minimum number of components and in a minimum of additional space.

Briefly, the present invention accomplishes the above cited objects by disposing a winding in inductive relation with the electrical conductor of the bushing, which is short circuited by an asymmetrically conductive device, such as a diode or rectifier. The winding is embedded in a cast ring member which is free to rotate on bearing means, and the cast ring is disposed in communication with the cooling fluid which is disposed within the bushing. The ring member has a plurality of grooves disposed thereon such that rotation of the ring will force or pump the cooling fluid through a closed coolant path in the bushing, in contact with the electrical conductor and solid insulation. The electrical current flowing in the electrical conductor of the bushing sets up a first magnetic field which induces a current flow in the winding embedded in the ring member. The asymmetrically conductive device allows current to flow within the embedded winding in one direction, and presents a high impedance to current flow in the other direction, thus allowing current to flow in the embedded winding only on predetermined half cycles of the alternating current flowing through the bushing conductor. The unidirectional current flow in the embedded winding sets up a second magetic field which reacts with the first magnetic field produced by current flow in the bushing conductor, to move the embedded conductor and thus rotate the ring. The embedded conductor is similar to a series type motor, with its speed of rotation being limited only by the friction of the bearing means and the fluid being pumped.

Further objects and advantages of the invention will become apparent as the following description proceeds and features of novelty which characterize the invention will be pointed out in particularity in the claims annexed to and forming a part of this specification.

For a better understanding of this invention, reference may be had to the following detailed description taken in connection with the accompanying drawings, in which:

FIGURE 1 is a perspective view, partially in phantom, illustrating electrical apparatus of the type which may utilize the teachings of the invention;

FIG. 2 is an elevational view, partially in section, illustrating an insulating bushing having a force cooling system constructed according to the teachings of the invention;

FIG. 3 is an enlarged elevational view of a portion of the insulating bushing shown in FIG. 2, illustrating the forced cooling system in detail; and FIG. 4 is a top sectional view of the forced cooling system shown in FIG. 3, taken along the line IV—IV of FIG. 3.

Referring now to the drawings, and FIG. 1 in particular, there is illustrated electrical apparatus of the type which may utilize the teachings of this invention. Specifically, FIG. 1 illustrates a power transformer 10, comprising high and low voltage windings 12 and 14, respectively, disposed in inductive relation with a magnetic core assembly 16. The windings 12 and 14 and magnetic core assembly 16 are disposed within a suitable metallic, grounded casing or tank 18 which has an insulating and cooling fluid, such as oil, disposed therein to a predetermined level. The tank 18 has a top portion or cover 20 which has a plurality of openings therein for receiving high and low voltage insulating bushings for bringing electrical conductors through the tank 18 for connection to the windings 12 and 14. The electrical insulating bushings must insulate the electrical conductors from the tank 18, and must do so with a minimum of stress concentration, and also must hermetically seal the openings in the tank. FIG. 1 illustrates only the high voltage bushings, such as bushings 22 and 24, disposed through the cover 20, with electrical conductors 26 and 28 connecting high voltage winding 12 with the electrical conductor portion of bushings 22 and 24, respectively. The low voltage bushings are not shown for purposes of simplicity.

The insulating bushings 22 and 24 must hold the voltage between the bushing electrical conductor and the grounded cover 20, and must distribute the voltage between the conductor and cover 20 in a uniform manner and prevent stress concentration which would cause corona.

The insulating bushings must also grade the voltage between the ends of the bushings, which are at the potential of the bushing electrical conductor, and the central grounded flange or mounting portion of the bushing, which is connected to the grounded cover 20. Further, the insulating bushings must carry the current which the transformer 10 will be called upon to carry, without exceeding the maximum operating temperature of the insulation utilized within the bushings.

As the transmission voltage magnitude of electrical power distribution systems increase, it becomes increasingly more difficult to meet the hereinbefore stated requirements that must be met by the bushings, without greatly increasing the cost or size, or both, of the bushings. For example, at transmission voltages of 500 kv. and higher, the insulation between the busing electrical conductor and the grounded flange becomes so thick that dissipation of the heat generated due to the $I^2R$ losses in the electrical conductor is a major problem that imposes a severe current limitation on bushings constructed in a conventional manner. It thus becomes necessary to either increase the quantity of material in the electrical conductor by increasing the outside diameter of the bushing conductor, while maintaining a predetermined wall thickness, which greatly increases the size and cost of not only the conductor but also the insulating and condenser sections of the bushing, the outer porcelain shells, and associated current transformers, or resorting to forced cooling of the bushing. Increasing the wall thickness of the bushing conductor instead of increasing the outside diameter of the bushing conductor, is not a practical solution, as the wall thickness of the conductor must be kept within certain predetermined limits, in order to keep eddy current losses at a minimum.

As hereinbefore stated, U.S. Patent 3,067,279 teaches forced cooling of an insulating bushing, whereby a current transformer is disposed in inductive relation with the electrical conductor of the bushing to provide an electrical potential for the operation of an electric motor and pump, which circulates a cooling medium through the bushing. This method of forced cooling insulating bushings has disadvantages in the cost of the additional apparatus required, the additional space required by the motor and pump, and the maintenance that the pump and motor will entail.

FIG. 2 illustrates an electrical insulating bushing, such as the bushing 22 shown in FIG. 1, which is forced cooled, and which does not require the conventional pump and electric motor of the hereinbefore mentioned patent.

More specifically, FIG. 2 illustrates an elevational view, partially in section, of a high voltage electrical insulating bushing 22 constructed according to the teachings of the invention. Since electrical bushings 22 and 24 are similar, it is only necessary to describe one of them in detail.

Electrical bushing 22 has a generally elongated shape, and includes a centrally or axially disposed electrical conductor 30, which has predetermined inner and outer diameters to form a wall section which will carry a predetermined current without excessive losses due to eddy currents. The electrical conductor 30 is constructed of a good electrical conductor, such as copper or alumnium, and is terminated at its upper end by a suitable terminal cap 32 which is adapted for connection to an external electrical conductor, and is terminated at its bottom end by terminal means 34, which is adapted for connection to conductor 26 and high voltage winding 12 within the transformer tank 18. The electrical conductor 30 has an insulating or condenser section 36 disposed thereon, which may be formed of layers of insulating material having a plurality of spaced metallic foil sheets 38 disposed therein to grade the radial and longitudinal voltage distribution in the bushing. The insulating or condenser section 36 may be formed by winding a high quality paper on the electrical conductor 30 while under a predetermined uniform tension, and feeding in metallic foil sheets or spiraled strips 38 at predetermined intervals to form a plurality of series capacitors. Since it is desirable to uniformly grade the radial voltage across the condenser section 36, the capacitance of each section should be equal. Thus, as the diameter of the capacitor plates 38 increases, the longitudinal lengths of the plates decrease in order to maintain the same surface area. The graduated length of the foil layers 38 provides graded voltage longitudinally or axially along the length of the bushing.

The condenser section 36 is oil impregnated to fill all voids in the structure to prevent the formation of corona, and also provide a minimum power factor to minimize dielectric heating of the structure.

A grounded metallic, non-magnetic flange member 40 is disposed intermediate the bushing 22 and adjacent the condenser section 36, for providing the means for attaching the bushing 22 to a transformer cover 20. Shell-like insulating members 42 and 44, usually constructed of an electrical grade of porcelain having a glazed, corrugated outer surface for providing additional creep distance, are disposed between the flnge member 40 and the upper terminal 36, and between the flange member 40 and the bottom terminal 34, respectively. The ends of the shell members 42 and 44 are machined flat and parallel to provide gasket surfaces for gaskets, such as those shown at 46 and 48, for hermetically sealing the bushing 22. Shell members 42 and 44 provide weatherproof insulating means between the ends of the bushings and the central grounded flange member 40, and also provide a container for an insulating and cooling fluid, such as oil, with which the bushing 22 is filled. Bushing 22 is constructed to provide a cavity or space 50 between the outer surface of the condenser section 36 and the flange member 40 and porcelain shell members 42 and 44, with a plurality of openings also being disposed axially or longitudinally through the wall section of the electrical conductor 30, which communicate with the cavity 50. The cavity 50 and openings through the wall section of electrical conductor 30 provide a closed path for circulation of the cooling fluid, such as oil, with which the bushing 22 is filled. Thus, the oil is brought into direct contact with the electrical conductor 30 for removing the heat generated therein, and it also brings the oil into direct contact with the condenser section 36 for removing any dielectrically produced heat, and the heat which is conducted into the insulation from the electrical conductor 30. The cooling fluid circulates to both ends of the electrical bushing 22, where the cooling medium may dissipate its heat to the atmosphere at the upper end of the bushing, and to the cooling medium disposed within tank 18 at the lower end of the bushing. The circulation of the cooling medium through the closed coolant path is acomplished by impeller means 60, shown disposed near the bottom end of electrical bushing 22, in communication with the fluid cooling means disposed within cavity 50. The direction of the flow of the cooling medium is upward through the openings in the wall section of electrical conductor 30, and downward over the condenser section 36.

The bottom portion of electrical insulating bushing 22, which contains impeller means 60, is shown in an enlarged view in FIG. 3, partially in section, and partially in phantom. As shown in the elevational view of FIG. 3, and a top view of the impeller means taken along the line IV—IV and shown in FIG. 4, means 60 is substantially ring-shaped and has a generally rectangular cross section. The inner surface of the impeller means 60 is grooved to form a spiral or helix 62, and the upper surface has a plurality of angular grooves 64 disposed across the width of the impeller means 60. Impeller means 60 is disposed with its inner surface in close physical relation with the outer surface of electrical conductor 30, with the clearance between the inner surface of impeller means 60 and conductor 30 being just sufficient to allow impeller means 60 to freely rotate without interference with the conductor. The upper surface of impeller means 60 is disposed adjacent the lower portion of the condenser section 36, also in a close physical relationship, but one that allows free rotation of the impeller means 60. Impeller means 60 is rotatably supported in this position between the bottom terminal 34 and condenser section 36, by ball-bearing means 66, which includes a plurality of ball-bearings 68 supported by retainer means 70. Impeller means 60 has a ball track formed on its bottom surface which is disposed in contact with the plurality of ball bearings 68. The ball bearings 68 and retainer means 70 may be formed from a suitable insulating means, such as a polymer.

The electrical conductor 30 has first and second diameters which produce a step in the outside diameter near the lower end of the bushing, with the impeller means being disposed on the second or smaller diameter immediately adjacent the first or larger diameter. The first or larger diameter portion of electrical conductor 30 has a plurality of openings 72 disposed axially throughout its length near its outer periphery, which are substantially parallel with one another and which are disposed parallel with the longitudinal axis of the electrical conductor. The openings 72 traverse the complete length of the first diameter, and are disposed sufficiently close to the outer periphery of the first diameter such that they open on the perpendicular portion of the step between the first and second diameters. The openings 72 through electrical conductor 30 join the cavity 50 at the top portion of the bushing 22, and they join the cavity 50 at the bottom portion of the bushing 22 through the space around the ball-bearings 68 and retainer means 70, and through the grooves 64 disposed across the top of the impeller means 60. The spiral groove 62 on the inner surface of the impeller means 60, and the grooves 64 disposed across the top portion of impeller means 60, are shaped such that when the impeler means 60 rotates in a predetermined direction, the cooling medium or oil from the cavity 50 will be moved upwardly by the spiral groove 62 and into the openings 72 disposed in the electrical conductor 30, causing the cooling medium from cavity 50 to flow into the spiral groove 62 through the bearing means 66, and thus into openings 72, and through grooves 64 directly into openings 72. The cooling medium is forced upwardly through the plurality of openings 72, cooling the electrical conductor 30, exiting at the top portion of the bushing 22 where the heated oil may give up its heat to the atmosphere through the upper terminal means 32. The oil then enters cavity 50 and flows downwardly over the condenser section 36, which provides cooling for the condenser section. The oil flows downwardly in cavity 50 until reaching the bottom portion of the bushing, which is submerged in the cooling medium contained in the tank 18 of the power transformer 10, giving up its heat through the lower terminal means 34 to the coolant disposed in tank 18. This cycle of the oil, as illustrated by the arrows in FIG. 3, continues as long as impeller means 60 is rotating. Gasket means 48 which may have two gaskets disposed in parallel, the first gasket 49 being of a material which will withstand the weight of the shell 44, and the second gasket 51 being a conventional sealing gasket, and gasket means 53, hermetically seal the lower end of the bushing 22.

Impeller means 60 rotates without any external mechanical driving means by deriving its operating energy from the electrical energy flowing through the electrical conductor 30. Impeller means 60 is similar to a ring type current transformer having a toroidal winding 80. As illustrated in FIG. 3, the toroidal winding 80 is disposed in inductive relation with a magnetic core 82, but the magnetic core is not essential to the invention. The magnetic core 82 may be included, if desired, in order to prevent the impeller from exceeding a predetermined rotational speed, by saturating on current surges through the conductor 30.

The winding 80 differs from a conventional current transformer in the way it is connected. The winding in a conventional current transformer disposed as show in FIG. 3, would be subjected to an alternating force. Since the force in one direction would be offset by an equal force in the opposite direction, no movement would be possible, even if the conventional current transformer were to be disposed to allow rotation. However, by allowing current to flow in the winding 80 in one direction, a unidirectional force on the winding 80 may be obtained which attempts to rotate the winding about the conductor 30. A unidirectional current flow in winding 80 may be provided by connecting an asymmetrically conductive device, such as a diode or rectifier 90, across the ends of the winding 80. Thus, when an alternating current is flowing to the electrical conductor 30, the magnetic field produced by the current will link with the winding 80, causing a current to be produced therein. The current flow in winding 80, will only ocur on a predetermined polarity of the alternating current half cycles of the alternating current in conductor 30, however, because diode 90 will block current flow when the alternating current in the conductor 30 is of the opposite polarity. The unidirectional current flow in winding 80 produces a magnetic field which reacts with the magnetic field being produced by the current flow in the conductor 30. Since the current in the winding 80 only flows in one direction, and since the current flow in winding 80 always occurs during a predetermined polarity of the current in the electrical conductor 30, the force applied to winding 80 will be unidirectional, thus causing the impeller means 60 to rotate in a predetermined direction. Thus, impeller means 60 rotates in response to current flow through electrical conductor 30, and is thus automatically coordinated to provide forced cooling when it is required, and the rotational speed is directly proportional to the magnitude of the current flow, which automatically provides cooling in response to the magnitude of the $I^2R$ losses. Impeller means 60 will rotate up to a maximum speed determined by the saturation point of the magnetic core 82, if a magnetic core is utilized, or up to the speed limited by the friction of the bearing means 66 and cooling fluid.

Impeller means 60 may be cast of a suitable filled or unfilled resin, such as an epoxy resin filled with silica, with the winding 80 and diode 90 being encapsulated or embedded in the resin system. The reliability of the impeller means 60 will be much greater than the reliability of the prior art system which utilizes separate motors and pumps, as the only moving parts are the impeller 60 and ball bearings 68. Since the ball bearings 68 are operated in a bath of oil, their life will be excellent. Also, since the lower end of the bushing 22 is disposed within the cooling medium of the transformer tank 18, the cooling of the diode 90 will be excellent, assuring a long life for the diode which is consistent with the normal maintenance procedures on the power transformer 10.

If desired, the winding 80 may actually be a plurality of windings, each having a diode 90 connected across its ends, and all disposed to produce a force in the same direction. Thus, the failure of a diode would only slightly reduce the rotational speed of the impeller 60.

In summary, there has been disclosed a new and improved forced cooling system for a high voltage electrical insulating bushings, which adds little to the initial cost of the bushing, requires substantially no additional space, and which has a high reliability factor. Further, the forced cooling means derives its operating energy from the current flowing through the bushing conductor 30, and is responsive to the magnitude of the current flow through the bushing, providing increased flow of the cooling oil as the magnitude of the current flow increases.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. An electrical insulating bushing having an electrical conductor and a cavity disposed therein which provides a closed path for circulation of fluid means within the bushing, fluid means disposed within said cavity, a rotatable member disposed in communication with said fluid means and in inductive relation with said electrical conductor, said rotatable member including an electrical winding having an asymmetrically conductive device connected across its ends.

2. A force cooled insulating bushing having an electrical conductor and a cavity which provides a closed path therein for circulation of fluid cooling means, fluid cooling means disposed within said cavity, a rotatable member disposed in communication with said fluid cooling means and in inductive relation with said electrical conductor, said rotatable member including an electrical winding having rectifier means connected across its ends, said rotatable member rotating and forcing said fluid cooling means through the closed path when alternating current flows through said electrical conductor.

3. An electrical insulating bushing comprising an electrical conductor disposed axially through the insulating bushing; first means disposed to surround and insulate a predetermined portion of said electrical conductor; second means disposed to surround said first means and a predetermined length of said electrical conductor to provide a sealed cavity between said first means and electrical conductor, and said second means; said electrical conductor having at least one opening disposed axially therethrough which is in communication with the cavity defined by said first and second means; fluid means disposed within the cavity in said bushing and in the connecting openings in said electrical conductor; a rotatable member disposed in communication with said fluid means and in inductive relation with said electrical conductor; said rotatable member including at least one electrical winding having rectifier means connected across its ends; said rotatable member rotating and forcing said fluid means to flow through the opening in said electrical conductor and the cavity between said first and second means when an alternating current flows through said electrical conductor.

4. An electrical insulating bushing comprising an electrical conductor disposed axially through the insulating bushing; first means disposed to surround and insulate a predetermined portion of said electrical conductor; second means disposed to surround said first means and a predetermined length of said electrical conductor to provide a sealed cavity between said first means and electrical conductor, and said second means; said electrical conductor having a plurality of openings disposed axially therethrough which are in communication with the cavity defined by said first and second means; fluid means disposed in the cavity in said bushing and in the connecting openings of said electrical conductor; a rotatable member disposed in communication with said fluid means and in inductive relation with said electrical conductor; said rotatable member including at least one electrical winding having rectifier means connected across its ends; said rotatable member rotating and forcing said fluid means to flow through the openings in said electrical conductor and the cavity between said first and second means, when an alternating current flows in said electrical conductor.

5. An electrical insulating bushing comprising an electrical conductor disposed axially through the insulating bushing; first means disposed to surround and insulate a predetermined portion of said electrical conductor; second means disposed to surround said first means and a predetermined length of said electrical conductor to provide a sealed cavity between said first means and electrical conductor, and said second means; said electrical conductor having a plurality of openings disposed axially therethrough which are in communication with the cavity defined by said first and second means and said electrical conductor; fluid means disposed in the cavity in said bushing and in the connecting openings in said electrical conductor; a rotatable substantially ring-shaped member disposed coaxially with said electrical conductor and in communication with said fluid means; said ring-shaped member having a plurality of grooves disposed therein which force the fluid means to flow through the openings in said electrical conductor and cavity when said ring-shaped member is rotating; said ring-shaped member having an electrical winding disposed therein which has rectifier means connected across its ends; said ring-shaped member rotating in a predetermined direction when an alternating current flows through said electrical conductor.

6. An electrical insulating bushing comprising an electrical conductor disposed axially through the insulating bushing; first means disposed to surround and electrically insulate a predetermined portion of said electrical conductor; second means disposed to surround said first means and a predetermined length of said electrical conductor to provide a sealed cavity between said first means and electrical conductor, and said second means; said electrical conductor having a plurality of openings disposed axially therethrough which are in communication with the cavity defined by said first and second means and said electrical conductor; fluid means disposed within the electrical bushing in the cavity and in the connecting openings to the cavity; a rotatable substantially ring-shaped member disposed coaxially with said electrical conductor and in communication with said fluid means; said ring-shaped member having a plurality of grooves disposed therein which force the fluid means to flow through the openings in said electrical conductor and cavity and when said ring-shaped member is rotating; said ring-shaped member comprising a resin encapsulated magnetic core having an electrical winding disposed thereon which has rectifier means connected across its ends; said ring-shaped member rotating in a predetermined direction when alternating current flows through said electrical conductor.

References Cited by the Examiner

UNITED STATES PATENTS 3,067,279 12/1962 Baker _____ 174—18
3,214,544 10/1965 Leeds _____ 174—15 X

FOREIGN PATENTS 364,823 11/1962 Switzerland.

LARAMIE E. ASKIN, *Primary Examiner.*